United States Patent [19]

Groeneveld et al.

[11] Patent Number: 4,732,330
[45] Date of Patent: Mar. 22, 1988

[54] DRIVE GEARBOX AND SPREADER IMPLEMENT

[75] Inventors: Wilbur E. Groeneveld, Celina; David M. Rieke, Galion, both of Ohio

[73] Assignee: New Idea Corporation, Coldwater, Ohio

[21] Appl. No.: 38,431

[22] Filed: Apr. 14, 1987

Related U.S. Application Data

[63] Continuation of Ser. No. 770,148, Aug. 27, 1985, abandoned.

[51] Int. Cl.$^4$ ............................................. A01L 19/00
[52] U.S. Cl. .................................... 239/670; 239/672; 239/677
[58] Field of Search .............. 239/661, 662, 670, 672, 239/677; 192/48.91

[56] References Cited

U.S. PATENT DOCUMENTS

| | | | |
|---|---|---|---|
| 2,019,073 | 10/1935 | Cooper et al. ............... | 192/48.91 X |
| 2,232,457 | 2/1941 | Holland ............................ | 192/18 R |
| 2,340,810 | 2/1944 | Hoffstetter .......................... | 239/670 |
| 3,014,729 | 12/1961 | Henningsen et al. . | |
| 3,583,242 | 6/1971 | Thornbloom et al. ......... | 239/677 X |
| 3,722,307 | 3/1973 | Campbell . | |
| 3,887,153 | 6/1975 | O'Reilly et al. . | |
| 3,964,714 | 6/1976 | Crawford et al. .............. | 239/672 X |
| 4,404,868 | 9/1983 | Kleine ............................. | 239/672 X |
| 4,480,735 | 11/1984 | Pingry ............................. | 239/677 X |
| 4,498,630 | 2/1985 | Sadler .................................. | 239/677 |

*Primary Examiner*—Andres Kashnikow
*Assistant Examiner*—Patrick N. Burkhart
*Attorney, Agent, or Firm*—Lockwood, Alex, FitzGibbon & Cummings

[57] ABSTRACT

A spreader implement and drive gearbox therefor are provided that incorporate a single gearbox for driving both a distributor assembly for throwing manure and the like out of the spreader implement and for driving a transporting assembly for moving the manure or the like toward the distributor assembly. The single gearbox provides direct gear drive of one of the assemblies. The drive gearbox may include one or more biased clutch assemblies for clutching or varying the driving speed transmitted by the gearbox.

16 Claims, 6 Drawing Figures

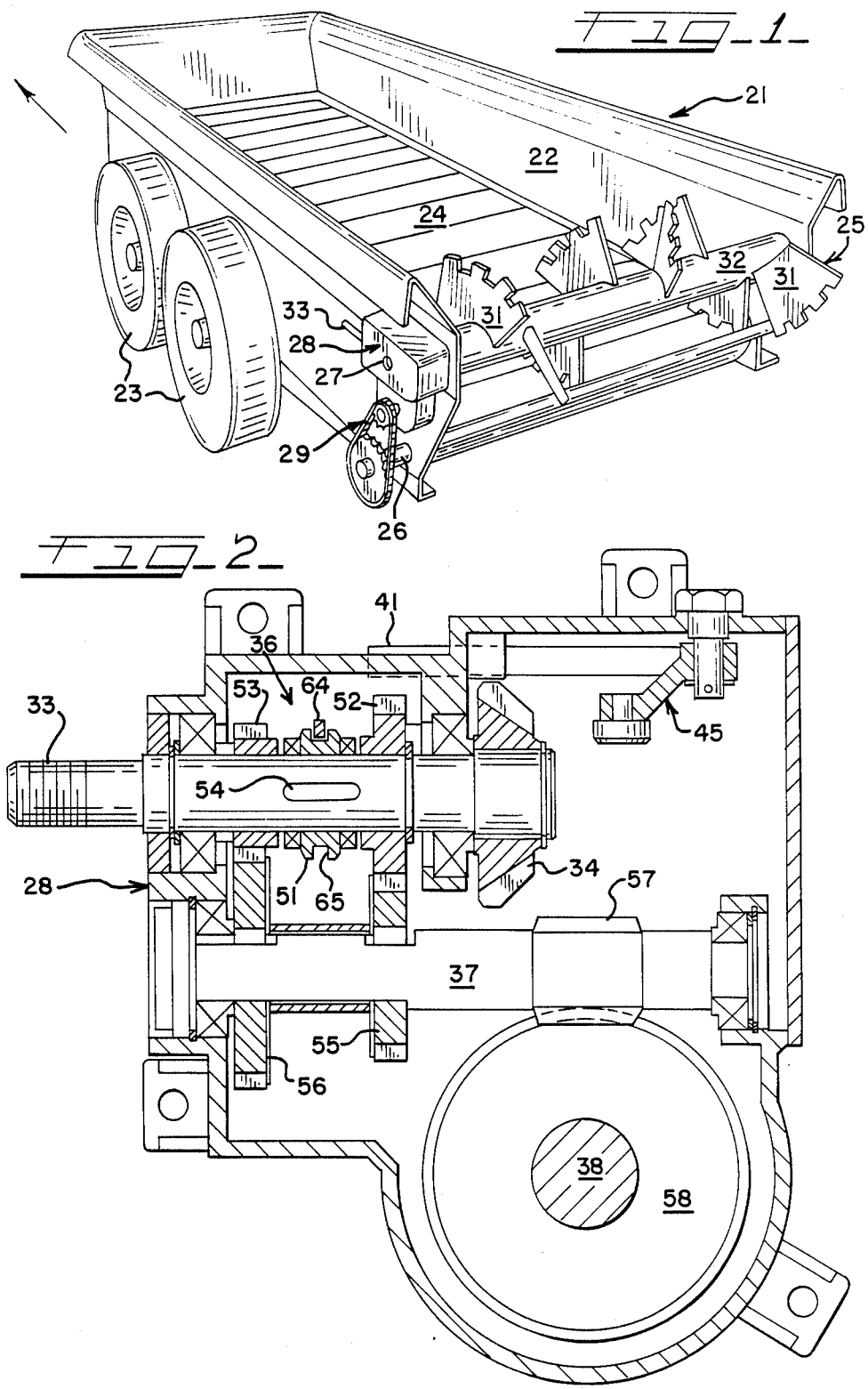

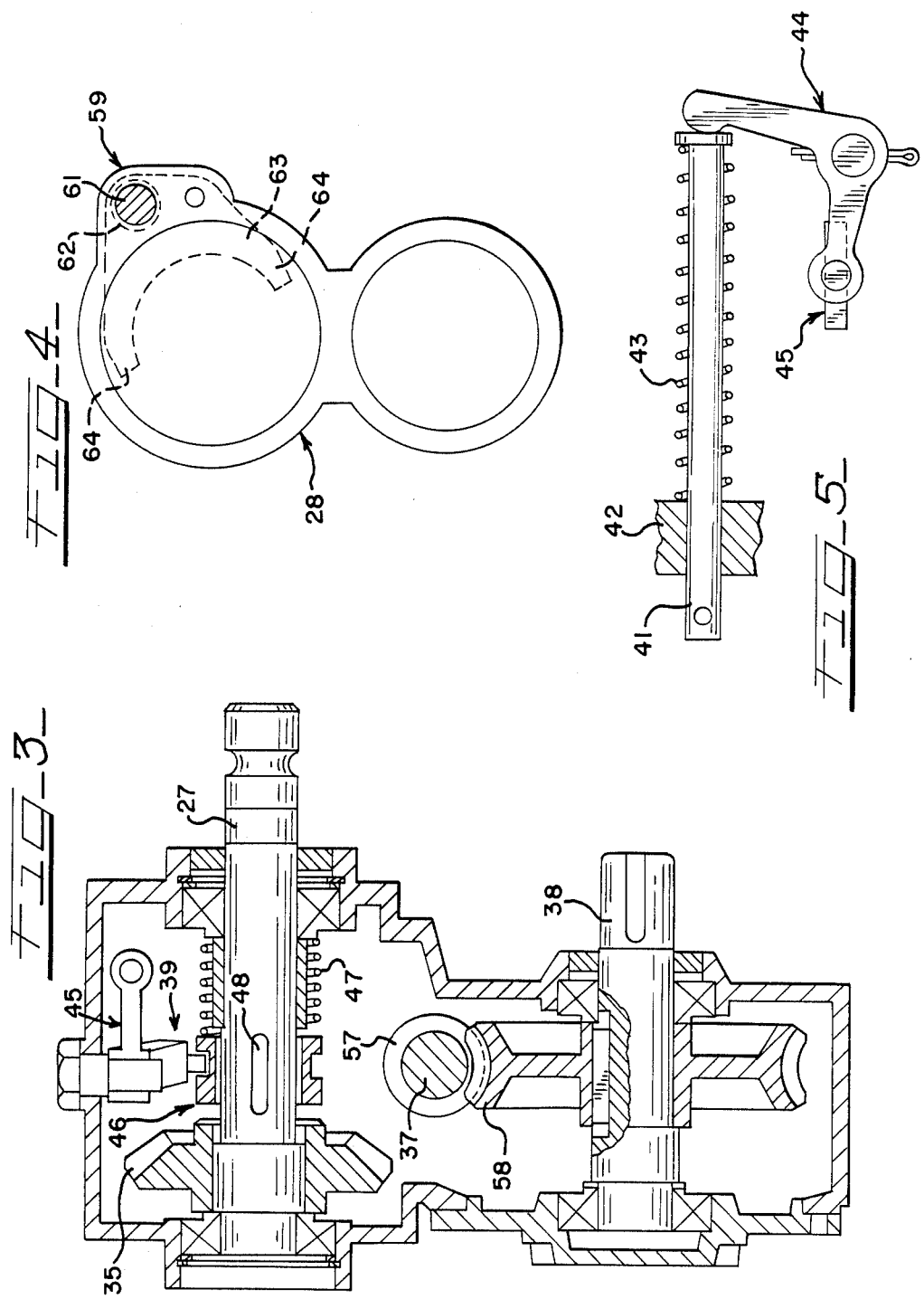

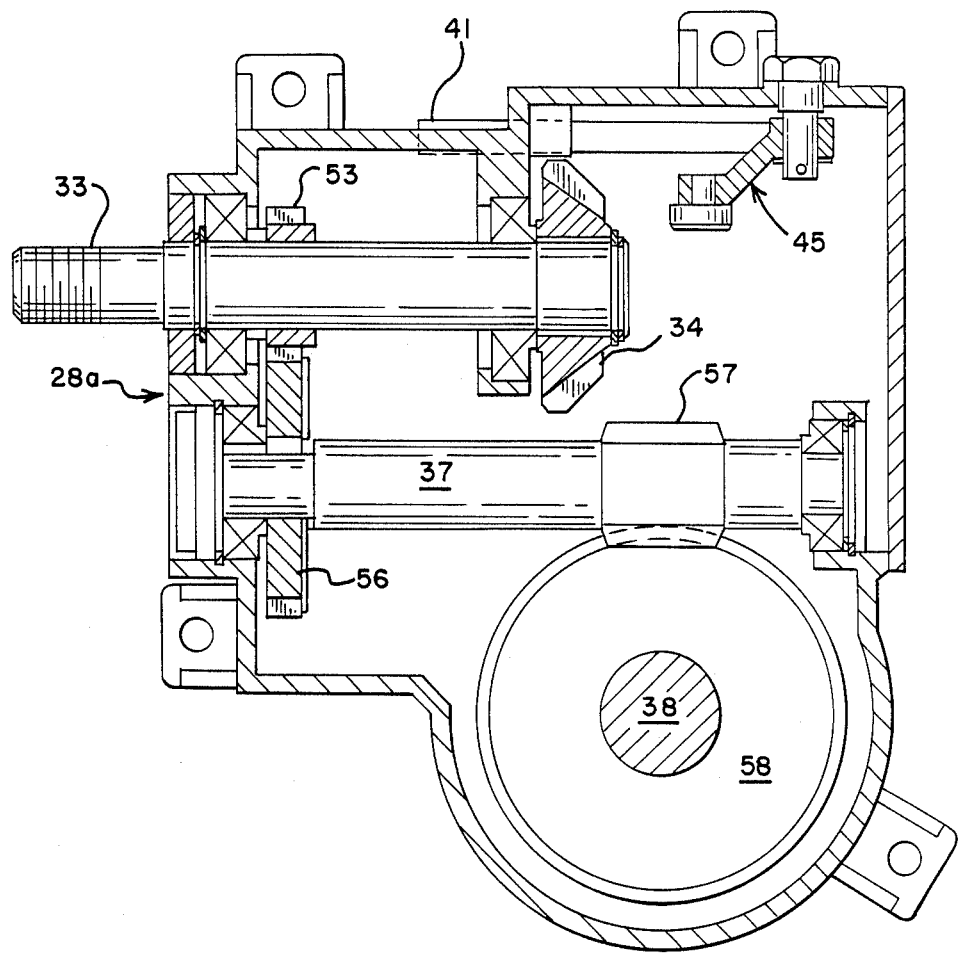

DRIVE GEARBOX AND SPREADER IMPLEMENT

DESCRIPTION

This application is a continuation of application Ser. No. 770,148 filed Aug. 27, 1985, now abandoned.

BACKGROUND AND DESCRIPTION OF THE INVENTION

This invention generally relates to implements of spreading manure and the like, as well as gearbox assemblies therefor, more particularly to spreader implements that include a box-like mobile body having a distributor assembly at its discharge end and means for transporting manure and the like within the box-like body toward the discharge end. In an important aspect of this invention, the distributor assembly and the transporting assembly are driven through a single gearbox mechanism which directly drives at least one of the assemblies, typically the distributor assembly.

Included in the various types of known spreaders for manure and the like is the type of spreader that has a box-like mobile body having an assembly for transporting manure therewithin toward a discharge end thereof, there being a distributor assembly at such discharge end for the purpose of moving the manure from the discharge end and off of the spreader for distribution onto a field or the like. Often, such spreaders include separate drive assemblies for the transporting assembly and for the distributor assembly. For example, separate chain drives and/or separate drive shafts and/or separate gearing assemblies are provided for each of the transporting assembly and the distributor assembly. Such separate drive assemblies increase the cost, complexity and weight of these spreader devices.

These types of spreader devices or implements also often include components for adjusting the rotational speed of, or for disengaging the drive to, the transporting assembly or the distributor assembly. In such instances it is desirable to provide shifting means therefor that are easy to operate and that are relatively inexpensive. Additional advantages, including safety advantages, can be realized if the controls for the drive means can be generally biased to a desired drive condition, such as to a neutral or undriven condition or to a selected drive speed.

Accordingly, there is a need for a spreader for manure and the like, as well as a drive assembly therefor, wherein the cost, ease of operation and safety characteristics thereof are simultaneously enhanced. Reduced weight and bulk of spreader drive assembly components are also desirable attributes for spreader implements such as manure spreaders and the like.

These various desirable attributes are achieved by the present invention, which provides drive assemblies for driving two separate shafts and that is especially well suited for driving both the shaft of a transporting assembly and the shaft of a distributor assembly of a mobile implement for spreading manure and the like, which multiple-shaft drive assembly includes direct gear drive of at least one of the shafts. The drive assembly may also include means for adjusting the speed of or disengaging the drive connection with respect to the driven shafts, preferably in association with a biased arrangement whereby only pulling forces are required to shift the drive assembly to a different rotational speed or to a disengaged mode.

It is accordingly a general object of the present invention to provide an improved mobile spreader implement.

It is another object of this invention to provide an improved spreader implement gearbox that is of simplified construction to permit reduction in the cost, weight and complexity of the driving assemblies for the spreader implement.

Another object of the present invention is to provide an improved spreader implement gearbox assembly that includes means for clutching and for shifting the speed of movement of drive shafts of the spreader.

Another object of the present invention is to provide an improved spreader drive assembly having clutching and shifting assemblies that are biased to a selected clutching or shifting orientation.

These and other objects, features and advantages of this invention will be clearly understood through a consideration of the following detailed description.

BRIEF DESCRIPTION OF THE DRAWINGS

In the course of this description, reference will be made to the accompanying drawings, wherein:

FIG. 1 is a perspective view of a typical spreader apparatus incorporating a gearbox assembly according to this invention;

FIG. 2 is a longitudinal cross-sectional view through the preferred gearbox according to this invention;

FIG. 3 is a transverse cross-sectional view of the gearbox embodiment illustrated in FIG. 2;

FIG. 4 is an end, elevational view of a portion of a gearbox assembly;

FIG. 5 is a detailed view of a portion of a biased control assembly included within the gearbox assembly; and FIG. 6 is a longitudinal cross-sectional view of another embodiment of the gearbox assembly.

DESCRIPTION OF THE PARTICULAR EMBODIMENTS

A spreader apparatus that embodies the features of this invention is generally designated as 21 in FIG. 1. The spreader apparatus or implement 21 includes a mobile body 22 that typically has a box-like configuration mounted onto suitable transport wheels 23. A transporting assembly 24, which may be in the nature of a movable apron or conveyor as illustrated, is structured and positioned to urge and move product such as manure toward and into a distributor assembly, generally designated as 25.

The transporting assembly 24 is driven by means of a main drive shaft 26, while the distributor assembly is driven by a main drive shaft 27 (FIG. 3). A gearbox assembly 28 drives the main drive shaft 27 and also drives the main drive shaft 26, at least one of such drives being a direct drive arrangement, while another is typically through a suitable assembly such as the illustrated chain and sprocket assembly 29. The distributor assembly 25 typically includes one or more beaters 31 mounted on a suitable tubular member 32 that rotates with the drive shaft 26.

Thus, after manure or the like is loaded into the mobile body 22, it is conveyed by the transporting assembly 24 to the distributor assembly 25, at which time the beaters 31 move the manure or the like in order to distribute it as desired off of the mobile body 22 and onto a agricultural field or the like while the spreader implement 21 is drawn behind a suitable traction vehicle such as a tractor or the like (not shown) in a manner that is well-known in the art. Power is imparted to the gearbox assembly 28 through an input shaft 33 which is driven by a power take off (P.T.O) of the traction vehicle, often through suitable intermediate drive arrangements as needed.

With more particular reference to the gearbox assembly 28, the input shaft 33 thereof is in driving engagement with a gear set, such as the illustrated bevel gear set including a bevel gear 34 (FIG. 2) and a bevel gear 35 (FIG. 3) which intermesh in order to directly drive one of the main shafts, typically the shaft 27 of the distributor assembly 25. A clutch assembly, generally designated as 36 may also be in operative engagement with the input shaft 33 in order to selectively drive a driven shaft 37 which in turn drivingly engages another of the main drive shafts, typically the drive shaft 26 of the transporting assembly 24, such as through the chain and sprocket assembly 29 in association with a sprocket shaft 38.

Regarding the particular embodiment of the gearbox assembly 28 as it is illustrated in the drawings, the driving communication between the set of gears 34, 35 and the main drive shaft 27 preferably includes a clutch assembly, generally designated as 39 (FIG. 3), which is biased or loaded to a non-driving or neutral condition so as to enhance the safety characteristics of the spreader apparatus 21, whereby the distributor assembly 25 will not rotate unless the biased clutch assembly 39 is intentionally overridden. Such overriding of the biased clutch assembly 39 is accomplished by imparting a pulling force to a control rod 41 (FIG. 5) that is slidably mounted through a wall 42 of the gearbox assembly 28.

Biased clutch assembly 39 that is illustrated includes a primary spring member 43 that urges the control rod 41 in a direction that is internal of the gearbox 28 and its wall 42. Thus urged, the control rod 41 maintains a bellcrank assembly 44 in a neutral orientation, which is the orientation illustrated in FIG. 3 and FIG. 5. Bellcrank assembly 44 engages a pin pivot assembly 45, which in turn operatively engages a slidable clutch mechanism such as the illustrated jaw clutch assembly 46. A secondary spring member 47 urges the jaw clutch assembly 46 such that there is engagement with the gear 35, whereupon rotation of the gear 35 imparts rotation to the jaw clutch assembly 46 which, by means of a suitable key structure 48 within the main drive shaft 27, rotates the main drive shaft 27 to thereby drive the distributor assembly 25 and rotate its beaters 31.

Provided the primary spring member 43 has sufficient strength or stiffness to override the secondary spring member 47, the biased clutch assembly 39 will remain in its neutral orientation until such time as the control rod 41 is pulled outwardly with respect to the gearbox assembly 28. The biased clutch assembly 39 is thus spring loaded into its neutral mode by having the primary spring member 43 exhibit a spring force that is greater than the spring force exhibited by the secondary spring member 47. By this structure, the distributor assembly 25 will not rotate unless the control rod 41 is pulled. If the control rod 41 is at rest, then the biased clutch assembly 39 does not operatively engage the main drive shaft 27, and the distributor assembly 25 will not rotate even if the P.T.O. drive is in operation.

The drive train for the transporting assembly 24 may likewise be biased to a desired mode or speed. In the embodiment illustrated in FIGS. 2, 3 and 4, the clutch assembly 36 is biased or loaded to a high-speed mode for resultant rotation of the main drive shaft 26 and movement of the transporting assembly 24. Clutch assembly 36 that is illustrated in FIG. 2 is shown in its neutral orientation. More particularly, a shift collar 51 of the clutch assembly 36 is arranged so as to be out of engagement with either high-speed gear 52 or a low-speed gear 53, and neither of these gears 52 or 53 will rotate with the shift collar 51. Shift collar 51 rotates with the input shaft 33 by virtue of a suitable key structure 54 by which the shift collar 51 is secured to the input shaft 33 while simultaneously being slidable along the the input shaft 33.

The high-speed gear 52 and the low-speed gear 53 each may, as illustrated, be a component of a spur gear pair which includes driven high-speed gear 55 and driven low-speed gear 56, either of which will rotate the driven shaft 37. In the illustrated embodiment, a worm gear 57 is secured to the driven shaft 37, and the worm gear 57 drives a worm wheel 58 that drives the sprocket shaft 38.

Clutch assembly 36 includes a shifter assembly, generally designated as 59 in FIG. 4. Shifter assembly 59 includes a control rod 61 that is slidable in opposition to a spring 62 positioned around that portion of the control rod 61 that is behind a yoke member 63 which is secured to the control rod 61. Yoke member 63 includes ears 64 that fit within annular slot 65 of the shift collar 51. Accordingly, when the control rod 61 is pulled (out of the plane of the paper in FIG. 4) the yoke member 63 moves such that its ears 64 move to the left as shown in FIG. 2 to thereby move the shift collar 51 in the same direction. Such movement of the shift collar 51 to the location shown in FIG. 2 shifts the clutch assembly 36 to its neutral mode, and the transporting assembly 24 is no longer driven.

Continued movement in this direction results in engagement of the low-speed gear 53, and rotation of the input shaft 33 effects rotation of the low-speed pair of gears 53, 56 and resultant slow speed movement of the transporting assembly 24. Because of the bias providing by the spring 62, release of the control rod 61 results in spring loaded movement of the shift collar 51 to the right as illustrated in FIG. 2 and into operative engagement with the high-speed gear 52 for effecting rotational movement of the pair of high-speed gears 52, 55.

Regarding the embodiment illustrated in FIG. 6, this embodiment is substantially identical with the embodiment illustrated in FIGS. 2, 3 and 5, except the clutch assembly 36 is omitted from its gearbox assembly 28a. Also omitted are the associated shifter assembly 59 and the second pair of spur gears 52, 55. In this simplified embodiment, the transporting assembly 24 has only a single driven speed, and it does not have a neutral mode.

By virtue of the embodiment illustrated in FIGS. 2, 3, 4, and 5, it is possible to operates the spreader implement 21 at a variety of different combinations of operational modes for the transporting assembly 24 and for the distributor assembly 25. A typical sequence in this regard is as follows.

With the clutch assembly 36 in its neutral orientation and with the biased clutch assembly 39 in its pulled or engaged orientation, the distributor assembly 25 is in operation while the transporting assembly 24 is not in operation. This might be particularly suitable for a start-up mode of the spreader implement 21. With a substantially full load of manure or the like, a typically avdantageous next mode for the spreader implement 21 would include further pulling of the control rod 61 until the shift collar 51 is in operative engagement with the low-speed gear pair 53, 56, while pulling tension is maintained on the control rod 41. By this mode, the transporting assembly 24 moves at the slow speed, while the distributor assembly 25 continues to remove manure or the like from the mobile body 22. As would typically be useful when the load of manure or the like becomes less plentiful while the body is being emptied, the fast speed movement of the transporting assembly 24 with continued movement of the distributor assembly 25 is achieved by releasing the control rod 61 while continuing with the pulling tension on the control rod 41. A typical clean-out mode is achieved by releasing the control rod 41 in order to stop the driving movement of the distributor assembly 25 while continuing with one of the driven speeds of the transporting assembly 24.

It will be understood that the embodiments of the present invention which have been described are illustrative of some of the applications of the principles of the present invention. Numerous modifications may be made by those skilled in the art without departing from the true spirit and scope of the invention.

What is claimed is:

1. A spreader implement having a mobile body and transporting means generally longitudinally positioned therewithin, the transporting means having a main drive shaft and a transport direction toward a discharge end of the mobile body, distributing means at the discharge end of the mobile body, said distributing means having a main drive shaft disposed generally parallel to said transporting means main drive shaft, and a unitary, compact gearbox assembly enclosed in a single housing, said gearbox assembly comprising: a single gearbox means for driving both the transporting means and the distributing means and the single gearbox means including:

an input shaft projecting partially within said gearbox means housing and that receives rotational power from an external mobile power source;

a direct drive assembly disposed generally parallel to said input shaft including a first gear assembly within said gearbox means housing, said first gear assembly directly driving one of the main drive shafts, a first bevel gear of said first gear assembly being secured onto said input shaft, said first bevel gear transmitting drive from said input shaft to one of said main drive shafts, a second bevel gear intermeshing with said first bevel gear and secured to said one of the main drive shafts, whereby said one of the main drive shafts is angularly offset from said first gear assembly, said direct drive assembly further including a biased first clutch means disposed within said single gearbox housing and having a control rod projecting into said gearbox housing, said biased first clutch means being biased to a disengaged orientation; and a drive train disposed in said gear box means single housing generally parallel to said input shaft and including a second gear assembly, said second gear assembly driving the other of said main drive shafts, said second gear assembly including a first spur gear secured onto said input shaft and in operative, driving engagement with a second spur gear secured to a driven shaft which is disposed within said single gearbox housing generally parallel to said input shaft, said drive train further including a worm gear secured to said driven shaft, said worm gear transmitting drive from said input shaft to the other of said main drive shafts, and a worm wheel driven by said worm gear, said worm wheel being in operative interengagement with said other main drive shaft, whereby said other of said main drive shaft is angularly offset from said driven shaft and said input shaft, said second gear assembly including second clutch means disposed within said single gearbox housing in operative interengagement with said input shaft, said second clutch means being for selectively transmitting rotational movement of the input shaft to said other main shaft, said second clutch means further being angularly offset from said first clutch means.

2. The spreader implement according to claim 1, wherein said biased first clutch means is biased to a disengaged orientation and is actuated to an engaged orientation by pulling said control rod.

3. The spreader implement according to claim 1, wherein said worm wheel is affixed to a rotatable shaft that is in operative interengagement with said other main drive shaft.

4. The spreader implement according to claim 1, wherein said second clutch means includes a shift collar secured to said input shaft, at least two pairs of said first and second spur gears that are in selective engagement with said shift collar, and one of said spur gear pairs drives said driven shaft at a speed faster than that provided by said other spur gear pair.

5. The spreader implement according to claim 1, wherein said second clutch means is biased to a predetermined mode of its selective transmission of rotational movement, and said second clutch means includes control rod means for overriding said biased predetermined mode by pulling said control rod.

6. The spreader implement according to claim 1, wherein said one main drive shaft is a component of said distributor means and wherein said other main drive shaft is a component of said transporting means.

7. A spreader implement having a mobile body and transporting means located therewithin, the transporting means having a transport movement direction toward a discharge portion of the mobile body, distributing means at the discharge portion of the mobile body and disposed generally parallel to said transporting means, and a unitary, compact gearbox assembly having a single housing, said gearbox assembly comprising a single gearbox means for driving both the transporting means and the distributor means, the gearbox means including:

an input shaft projecting partially within said gearbox means housing and that receives rotational power from a traction vehicle;

a direct drive assembly within said gearbox means housing and disposed generally parallel to said input shaft, said direct drive assembly including gear means for directly driving a main drive shaft of said distributor means, the distributor means main drive shaft being angularly offset from said input shaft, a first gear of said direct drive gear means being secured to said input shaft, a second gear of said direct drive gear means being secured to said main drive shaft of the distributor means, and said first gear intermeshes with said second gear, said direct drive assembly further including a biased first clutch means having a control rod projecting into said single gearbox housing, said biased first clutch means being biased to a disengaged orientation; and a drive train disposed in said gearbox means generally parallel to said input shaft including another gear assembly with said gearbox means housing, said another gear assembly driving a main drive shaft of said transporting means which is angularly offset from said driven shaft and said input shaft, said drive train gear assembly includes a pair of intermeshing gears driven by said input shaft and driving a driven shaft and a worm gear secured to said driven shaft and a worm wheel driven by said worm gear, said worm wheel being affixed to a rotatable shaft that is in operative interengagement with said main drive shaft of the transporting means, said another gear assembly including second clutch means angularly offset from said first clutch means and disposed within said single gearbox housing for selectively transmitting rotational movement of said input shaft to said main drive shaft of said transporting means.

8. The spreader implement according to claim 7, wherein said biased first clutch means is biased to a disengaged orientation and is actuated to an engaged orientation by pulling said control rod.

9. The spreader implement according to claim 7, wherein said second clutch means includes a shift collar keyed to said input shaft, at least two pairs of spur gears that are in selective engagement with said shift collar and that transmit rotational motion to said main drive shaft of the transporting means, and one of said spur gears has an output speed that is greater than the output speed of the other of said spur gear pairs.

10. The spreader implement according to claim 9, wherein said second clutch means is biased to a predetermined mode of its selective transmission of rotational movement, and said second clutch means includes control rod means for overriding said biased predetermined mode by pulling said control rod.

11. A gearbox assembly for a spreader implement and the like having a plurality of main drive shafts disposed generally parallel to each other, the gearbox assembly comprising:

an input shaft projecting partially within a unitary, compact housing of said gearbox means and that receives rotational power from an external mobile power source;

a direct drive assembly disposed generally parallel to said input shafts including a first gear assembly directly driving one of the main drive shafts, a first gear of said first gear assembly being secured onto said input shaft, a second gear intermeshing with said first gear and secured to said one of the main drive shafts, said first gear transmitting drive to said second gear and said one of the main drive shafts being angularly offset from said first gear assembly said first gear assembly including biased first clutch means disposed in said single gearbox housing, said first clutch means having a control rod projecting into said single gearbox housing; and a drive train including a second gear assembly within said gearbox means housing, said drive train being disposed in said gearbox means housing generally parallel to said input shaft, said second gear assembly driving the other of said main drive shafts, said second gear assembly including a first spur gear secured onto said input shaft and in operative, driving engagement with a second spur gear secured to a driven shaft, said drive train further including a worm gear secured to said driven shaft and a worm wheel driven by said worm gear, said worm wheel being in operative interengagement with said other main drive shaft and transmitting driven from said input shaft to said other main drive shaft, said other main drive shaft being angularly offset from said direct drive assembly and said input shaft said second gear assembly further including second clutch means angularly offset from said first clutch means and operatively interengaged with said input shaft for selectively transmitting rotational movement of said input shaft to said other main drive shaft.

12. The gearbox assembly according to claim 11, wherein said first and second gears of said first gear assembly are a pair of intermeshing bevel gears.

13. The gearbox assembly according to claim 11, wherein said biased first clutch means is biased to a disengaged orientation and is actuated to an engaged orientation by pulling said control rod.

14. The gearbox assembly according to claim 11, wherein said worm wheel is affixed to a rotatable shaft that is in operative interengagement with said other main driven shaft.

15. The gearbox assembly according to claim 11, wherein said second clutch means includes a shift collar secured to said input shaft, at least two pairs of said first and second spur gears that are in selective engagement with said shift collar, and one of said spur gear pairs drives said driven shaft at a speed faster than that provided by said other spur gear pair.

16. The gearbox assembly according to claim 15, wherein said second clutch means is biased to a predetermined mode of its selective transmission of rotational movement, and said second clutch means includes control rod means projecting within said single gearbox housing for overriding said biased predetermined mode by pulling said control rod.

* * * * *